United States Patent [19]
Schenk

[11] Patent Number: 6,123,381
[45] Date of Patent: Sep. 26, 2000

[54] DEVICE FOR STOWING THE ROOF STRUCTURE OF A HARDTOP VEHICLE

[75] Inventor: Bernhard Schenk, Boeblingen, Germany

[73] Assignee: DaimlerChrysler AG, Stuttgart, Germany

[21] Appl. No.: 09/196,247

[22] Filed: Nov. 20, 1998

[30] Foreign Application Priority Data

Nov. 21, 1997 [DE] Germany .................. 197 51 660

[51] Int. Cl.[7] ................................................ B60J 7/00
[52] U.S. Cl. ............................ 296/107.07; 296/146.14
[58] Field of Search .................. 296/146.14, 107.07

[56] References Cited

U.S. PATENT DOCUMENTS

| | | | |
|---|---|---|---|
| 2,833,593 | 5/1958 | Olivier et al. | 296/107.07 X |
| 3,332,169 | 7/1967 | Lohr et al. | 296/146.14 X |
| 3,536,354 | 10/1970 | Ingram | 296/146.14 X |
| 4,784,428 | 11/1988 | Mou et al. | 296/146.14 X |
| 5,788,316 | 8/1998 | Rothe | 296/146.14 X |

FOREIGN PATENT DOCUMENTS

| | | | |
|---|---|---|---|
| 003416330 | 11/1985 | Germany | 296/146.14 |
| 38 08 910 C2 | 10/1989 | Germany . | |
| 44 45 580 C1 | 12/1995 | Germany . | |
| 44 45 944 C1 | 4/1996 | Germany . | |
| 195 16 877 C1 | 10/1996 | Germany . | |
| 000918909 | 2/1963 | United Kingdom | 296/146.14 |

*Primary Examiner*—Joseph D. Pape
*Attorney, Agent, or Firm*—Evenson, McKeown, Edwards & Lenahan, P.L.L.C.

[57] ABSTRACT

Hardtop vehicle provided with a front roof part, a rear roof part having a fixed rear window, with lateral main links to move the front and rear roof parts, and with lateral vehicle pillars connected with the main links. The rear window is provided with at least one lateral frame that is articulated by lateral levers connected with the frame by a joint on the vehicle pillar, with the rear window being pivotable relative to the vehicle pillar during the stowing movement of the roof parts and being capable of being stowed with its convexity in the same direction as the front roof part in the rear vehicle area.

6 Claims, 4 Drawing Sheets

DEVICE FOR STOWING THE ROOF STRUCTURE OF A HARDTOP VEHICLE

BACKGROUND AND SUMMARY OF THE INVENTION

This application claims the priority of German Patent Application No. 197 51 660.2, filed Nov. 21, 1997, the disclosure of which is expressly incorporated by reference herein.

The invention relates to a roof-stowing device, and more particularly to a device which permits the vehicle roof to be stored in a confined area in the rear of the vehicle.

Devices similar to the present invention for hardtop vehicles are described for example in DE 44 45 944 C1 and are also known from DE 44 45 580 C1 and DE 195 16 877 C1.

Stowing of the roof structure, with a front roof part and a rear roof part provided with a fixed rear window, can be performed in different ways. In one simple manner, pivoting takes place around a main pivot in such fashion that the front roof part and the rear roof part with the rear window, are pivoted in such a way that their convexity is in opposite directions, are stowed in the rear area of the vehicle. This type of stowing has the disadvantage that it results in the loss of a considerable portion of the volume of the trunk.

In another type of stowing arrangement, the roof composed of the front roof part and the rear roof part is stowed together with the rear window, each convexity thereof being curved in the same direction. Although this results in considerably less trunk space being occupied, the disadvantage is that the kinematics required for this stowing is relatively expensive and in part also results in the need to make the rear of the vehicle higher.

A lowerable folding top is known from DE 38 08 910 C2. In this device, when the folding top is opened, the rear window is stowed under forced control together with the folding top in the storage compartment, and is displaced to a position in front of the rear opening when the folding top is closed.

The goal of the present invention is to retain the advantages of a compact stowing of the roof structure with each roof part curvature being in the same direction, while avoiding the disadvantages associated with the prior art, especially by simplifying the stowing kinematics.

While in the prior art the front roof part and rear roof part together with the rear window permanently attached thereto rotate around a main pivot when the roof structure is stowed, according to the present invention the rear window is uncoupled from the rear roof part and provided with a separate frame. Lateral levers are fastened to the frame, the levers each being pivotable around a pivot on the vehicle pillar, generally the C-pillar. In this manner, the rear window is rotatable separately from the rear roof part. The rear window can be pivoted separately during the stowing movement of the roof parts in such fashion that it is stowed in the same direction and/or in the same direction of curvature as the front roof part. This means that much less trunk space is required by comparison with stowing in opposite directions. This advantageous form of stowing is achieved by simple kinematics, namely the two lateral levers and the articulated connection with the vehicle pillar.

In simple fashion, a forced guidance and/or forced movement can be achieved during stowing of the roof structure by means of forced guidance levers connected with the lateral levers. The forced guidance levers are in turn articulated with the main links, which means that no separate drive is required for storing the rear window.

Of course, it is also possible if necessary and within the scope of the invention to provide a separate drive for the two lateral levers when additional levers would lead to space problems for example.

Other objects, advantages and novel features of the present invention will become apparent from the following detailed description of the invention when considered in conjunction with the accompanying drawings.

DETAILED DESCRIPTION OF THE DRAWINGS

Figure 1:
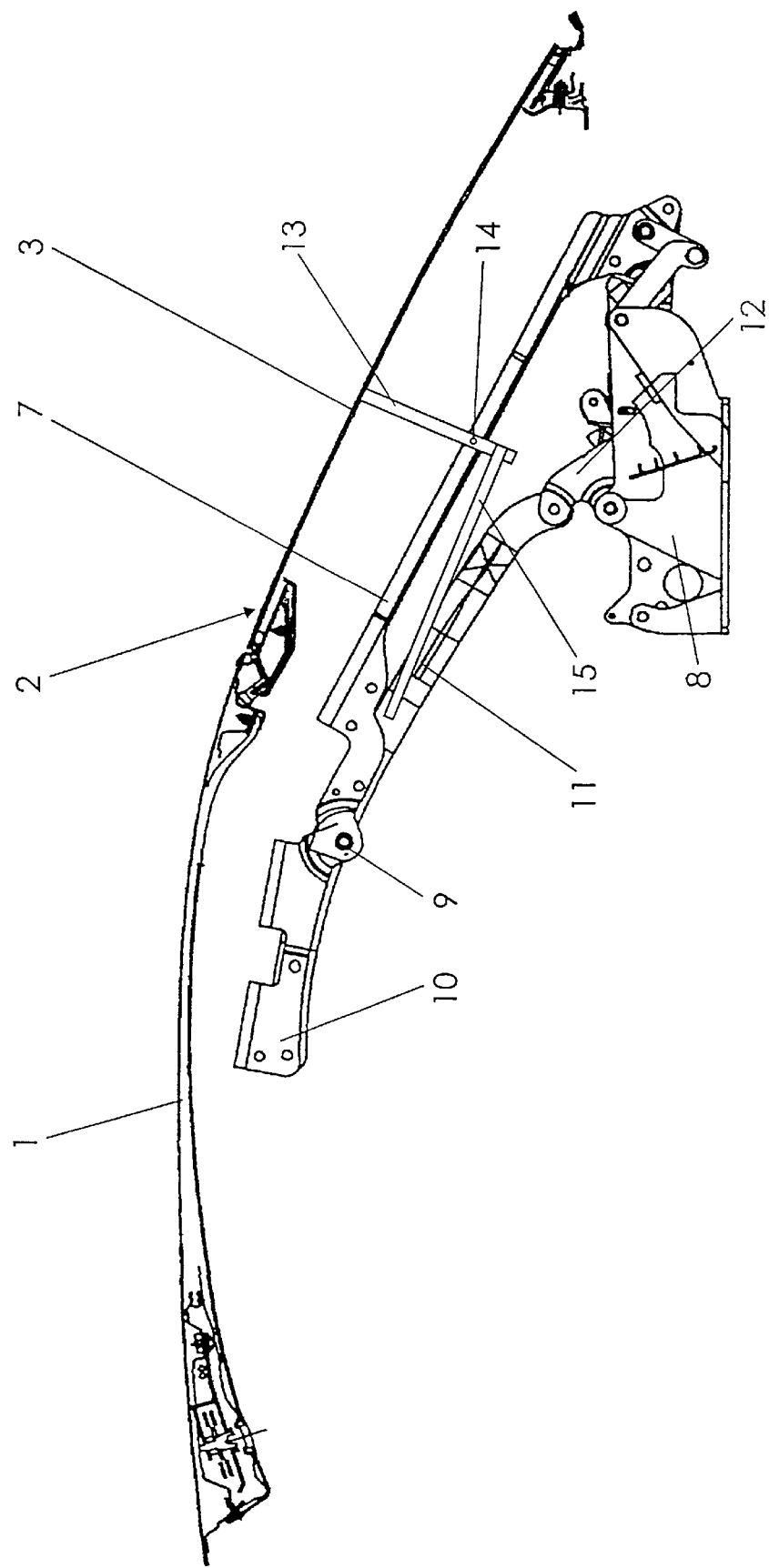
FIG. 1 is a side view of the roof structure for a hardtop vehicle with the main actuating members in the closed state.

Basically, the roof stowing device functions in known fashion for a hardtop vehicle, and therefore only the parts that are essential to the present invention will be discussed in greater detail below. The roof structure has a front roof part 1 and a rear roof part 2 releasably connected therewith. The rear roof part 2 has a rear window 3 with lateral frames 4 as well as sealing parts 5, 6 and lateral C-pillars 7 as vehicle pillars. At the rear, the lateral C-pillars are each connected with articulation with a main bearing 8. Lateral C-pillars 7 each have at a forward end a main pivot 9 to which a hinge 10 for the front roof part 1 is also articulated. At the end of hinge 10 opposite main pivot 9, one end of a main link 11 is articulated. The other end of link 11 is connected by an intermediate lever 12 with main bearing 8.

Frame 4 of rear window 3 is permanently attached to a lever 13 which extends at right angles from frame 4 in the central area of rear window 3. Lever 13 is articulated by a pivot 14 with C-pillar 7 or the pillar cladding.

Lever 13 is permanently attached to a forced guidance lever 15 at its end facing pivot 14. Lever 15 is articulated at its end facing away from lever 13 with the corresponding main link 11.

Figure 2:
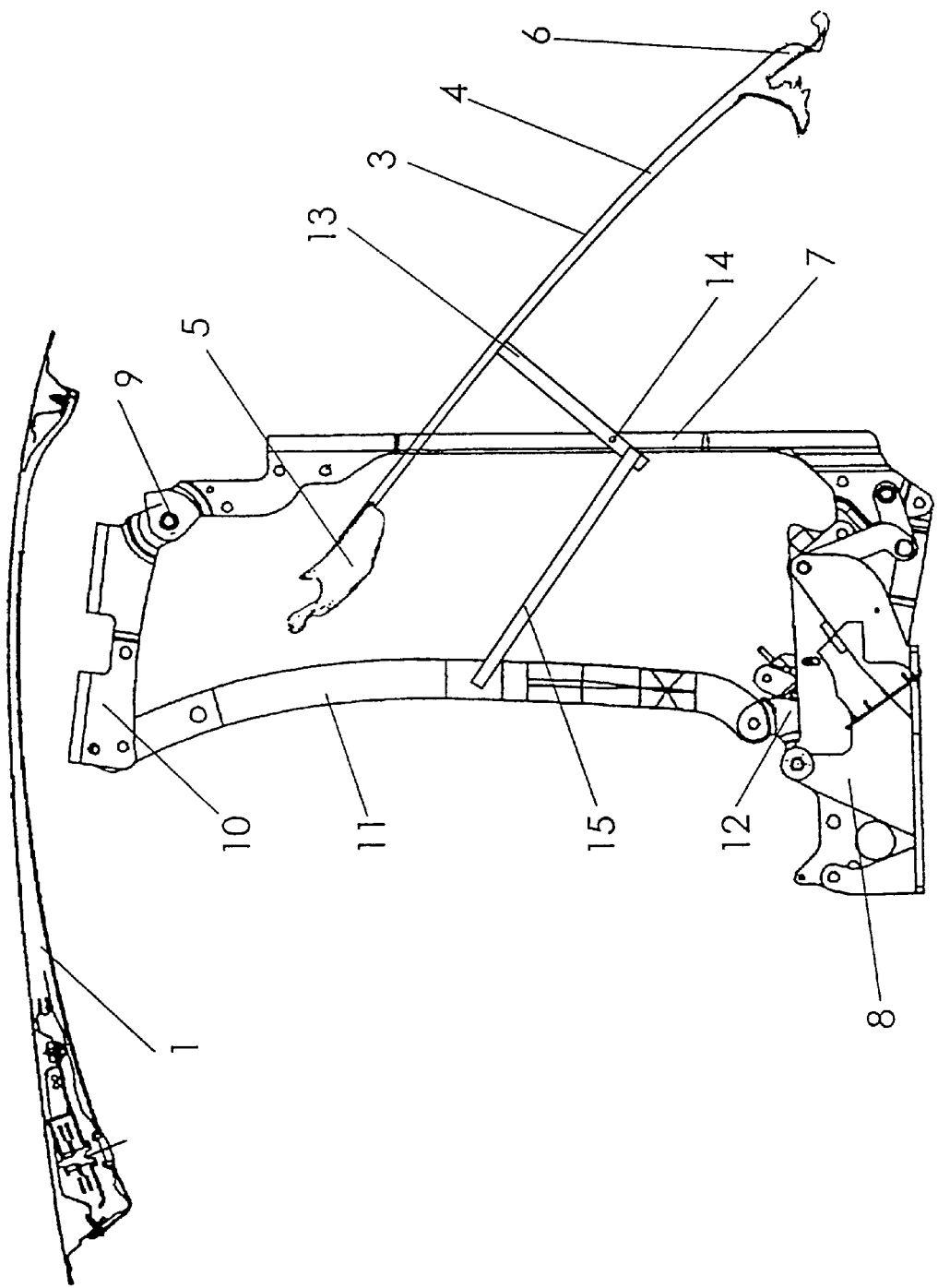
FIG. 2 shows a first stage during the stowing process of the roof structure.
Figure 3:
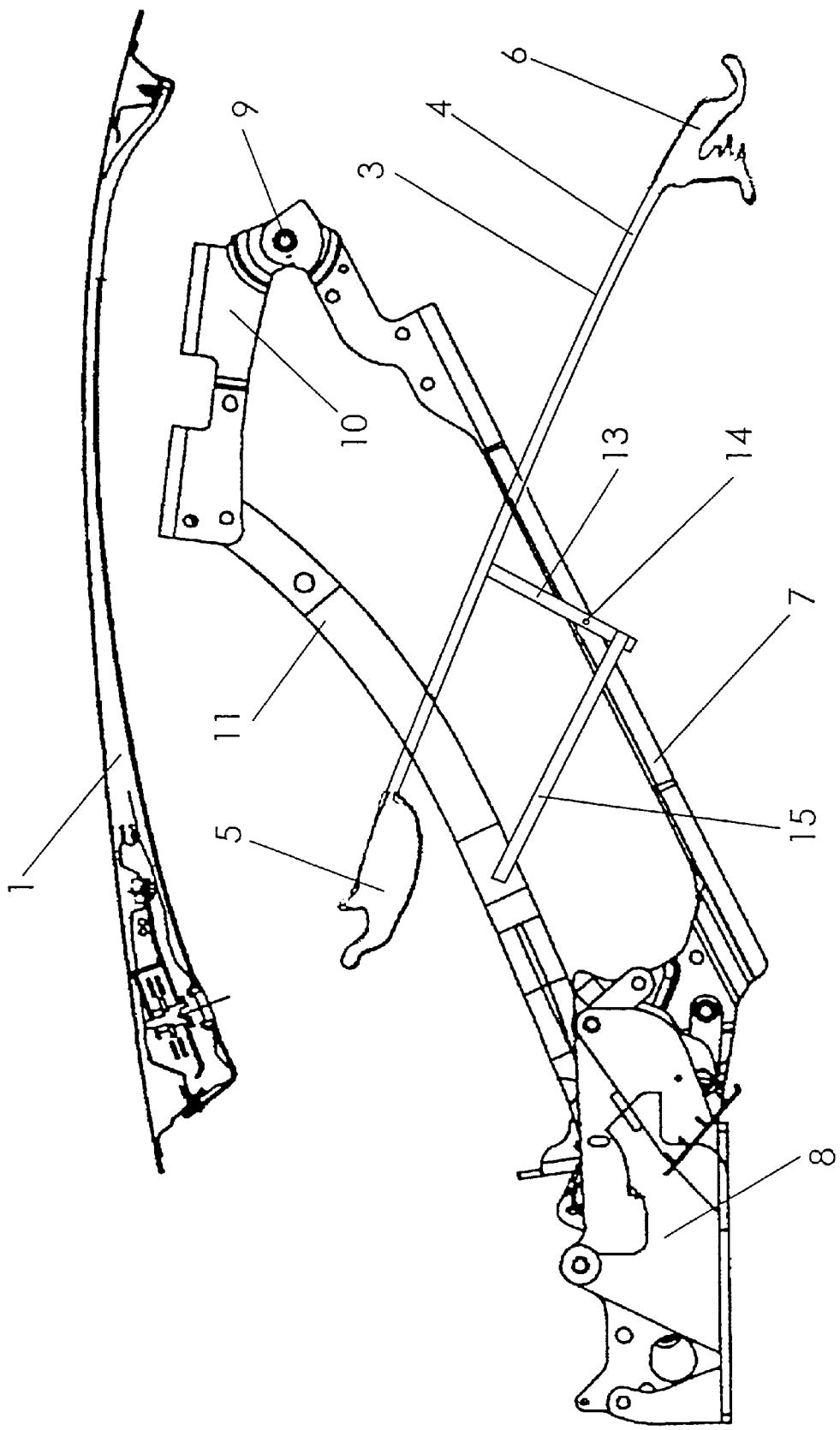
FIG. 3 shows a second stage during the stowing process of the roof structure.
Figure 4:
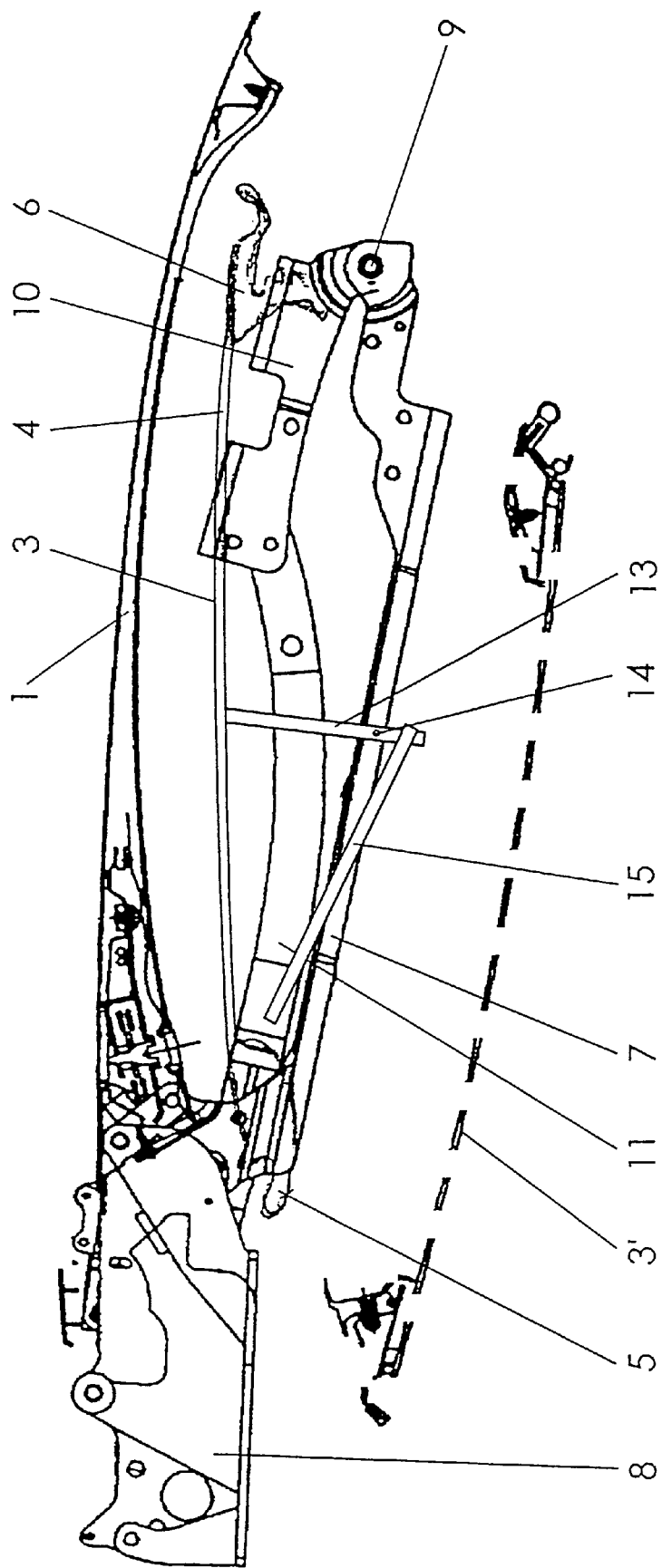
FIG. 4 shows the roof structure in the stowed state.

The stowing movement of the roof structure is evident from FIGS. 2 to 4. With a drive (not shown) for main link 11 through intermediate lever 12, rear window 3 is moved simultaneously with forced guidance by forced guidance lever 15 and lever 13. As a result of the arrangement of the levers and articulation points described above, rear window 3 and its frame 4 are stowed separately from C-pillars 7. The stowing movement is performed with forced guidance in such fashion that rear window 3 with frame 4 does not perform a rotary movement rearward but only a slight pivoting movement downward and rearward, with rear window 3 basically retaining its horizontal position. In other words, the front and/or upper seal (sealing part 5) remains at the front and the rear seal 6 remains at the rear.

As is evident from FIG. 4, in the stowed state, front roof part 1 and rear window 3, curved in the same direction to save space, or with the same convexity, are located in the rear area of the vehicle. In FIG. 4, a rear window 3', indicated by a dashed line, is also drawn in the position that it would occupy if it moved according to the prior art. As can be seen, considerable space is saved by stowing rear window 3 according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. In a hardtop vehicle, a device is provided for stowing a roof structure and comprises a front roof part, a rigid rear roof part provided with a fixed rear window having a convexity, lateral main links that move the front and rear roof parts, and lateral vehicle pillars connected with the main links, wherein the rear window is provided with at least one lateral frame which is articulated by lateral levers connected with the lateral frame at joints on the vehicle, the rear window being pivotable relative to the lateral vehicle pillars during stowing movement of the roof parts, and when stowed the convexity thereof is in the same direction as that of the front roof part in the rear area of the vehicle.

2. In the hardtop vehicle according to claim 1, wherein the lateral levers are each connected at one end at least approximately perpendicularly and rigidly with the frame of the rear window, and the lateral levers are each articulated at the other end at least approximately in central areas of the vehicle pillars by the joints.

3. In the hardtop vehicle according to claim 1, wherein the levers are operatively connected with forced guidance levers having free ends articulated to the main links.

4. In the hardtop vehicle according to claim 1, wherein the levers are configured to be provided with an independent drive device.

5. In the hardtop vehicle according to claim 2, wherein the levers are operatively connected with forced guidance levers having free ends articulated to the main links.

6. In the hardtop vehicle according to claim 2, wherein the levers are configured to be provided with an independent drive device.

* * * * *